No. 870,258. PATENTED NOV. 5, 1907.
E. O. SUTTON.
DRIVING MECHANISM FOR AUTOMOBILES.
APPLICATION FILED FEB. 15, 1907.

3 SHEETS—SHEET 3.

Witnesses:
H. L. Sprague
H. W. Bowen

Inventor:
Edward O. Sutton
by Chapin & Co
Attorneys

UNITED STATES PATENT OFFICE.

EDWARD O. SUTTON, OF SPRINGFIELD, MASSACHUSETTS.

DRIVING MECHANISM FOR AUTOMOBILES.

No. 870,258.          Specification of Letters Patent.          Patented Nov. 5, 1907.

Application filed February 15, 1907. Serial No. 357,537.

*To all whom it may concern:*

Be it known that I, EDWARD O. SUTTON, a citizen of the United States of America, residing at Springfield, in the county of Hampden and State of Massachusetts, have invented new and useful Improvements in Driving Mechanism for Automobiles, of which the following is a specification.

This invention relates to driving mechanisms primarily adapted for use on self-propelled vehicles, and it relates specifically to means for frictionally rotating the driving-wheels of the vehicle, the object of the invention being to provide a friction drive, the active elements of which are constantly in contact, clutches being associated with said driving mechanism so arranged that the rotation of the driving-wheel in opposite directions is effected by the actuation of the clutches instead of moving the driven friction disk past the axis of the driving friction disk, as is the general practice at present in this class of mechanisms.

A further object of the invention lies in the provision of means whereby the driven friction disk may be shifted radially of the driving disk and at the proper time rotatively engage with the shaft on which it is mounted by the actuation of a clutch, the means to actuate the clutch and the driven friction disk being common to both, or so actuated in unison as to effect the engagement of the clutch when the friction disks are in a certain relative position one to another.

Still another object of the invention is to provide a friction drive of the character described loosely mounted on the driving axle of the vehicle, and a clutch slidably and rotatably mounted thereon, said driving axle also supporting devices to move the friction driven disk radially of the driving disk and to actuate the clutch at the proper time, and connections, whereby these devices are operated extending to another point on the vehicle accessible to the operator.

The invention is clearly illustrated in the accompanying drawings, in which,—

Figure 1:
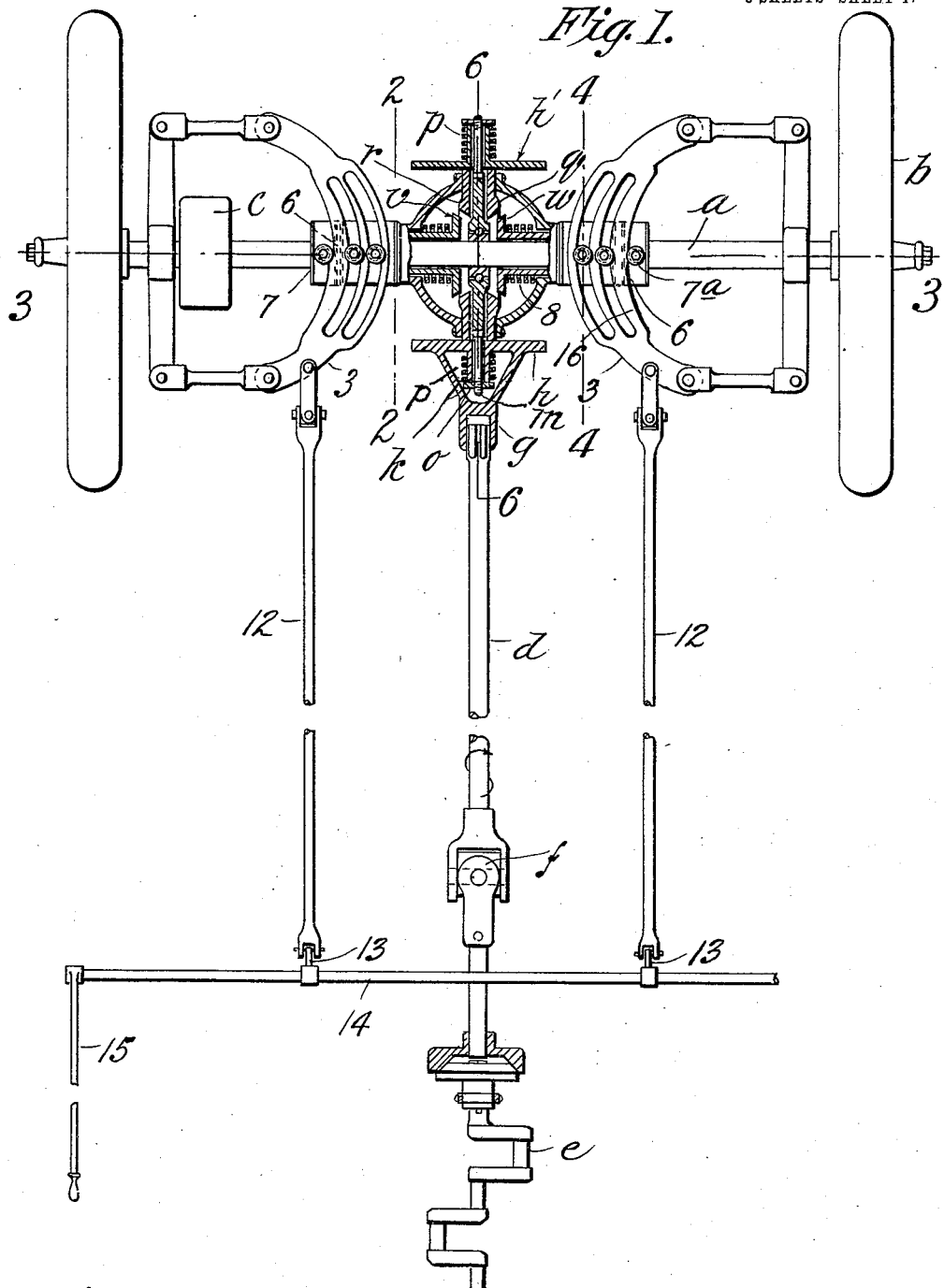
Figure 2:
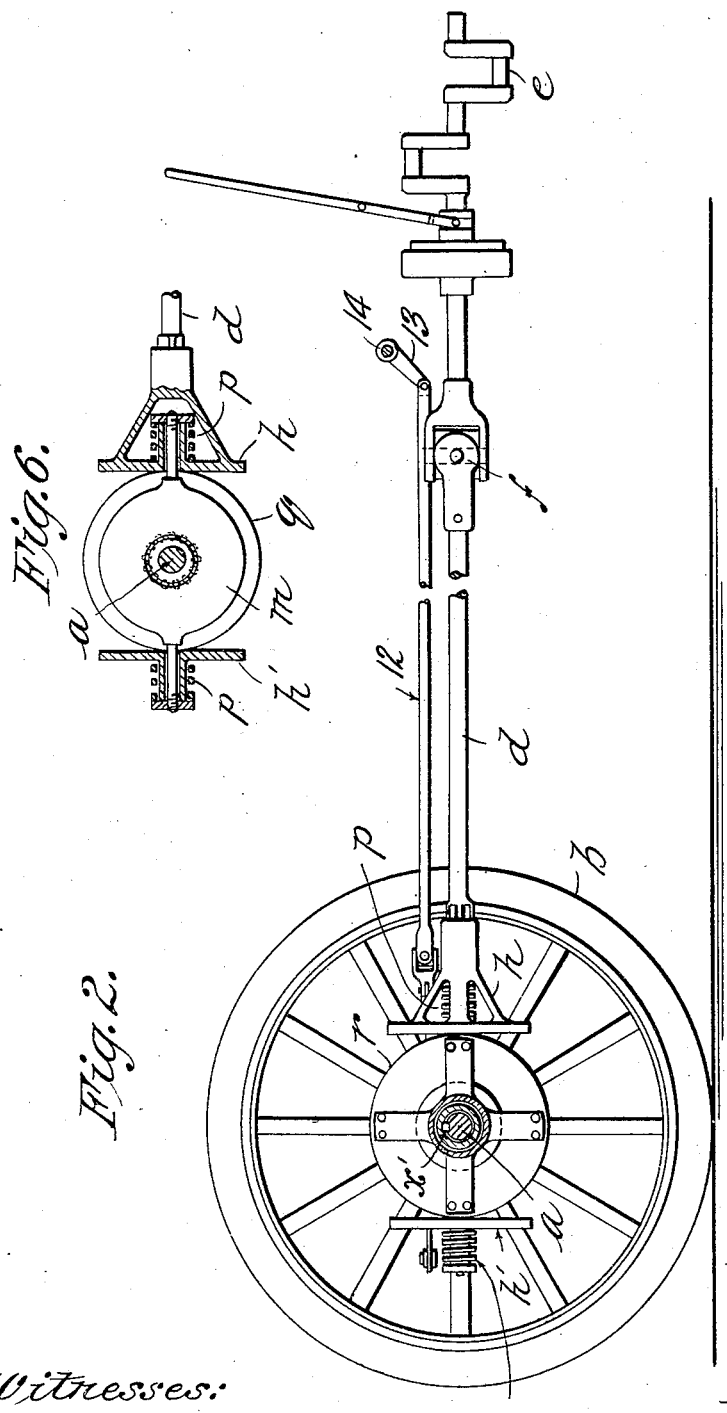
Figure 3:
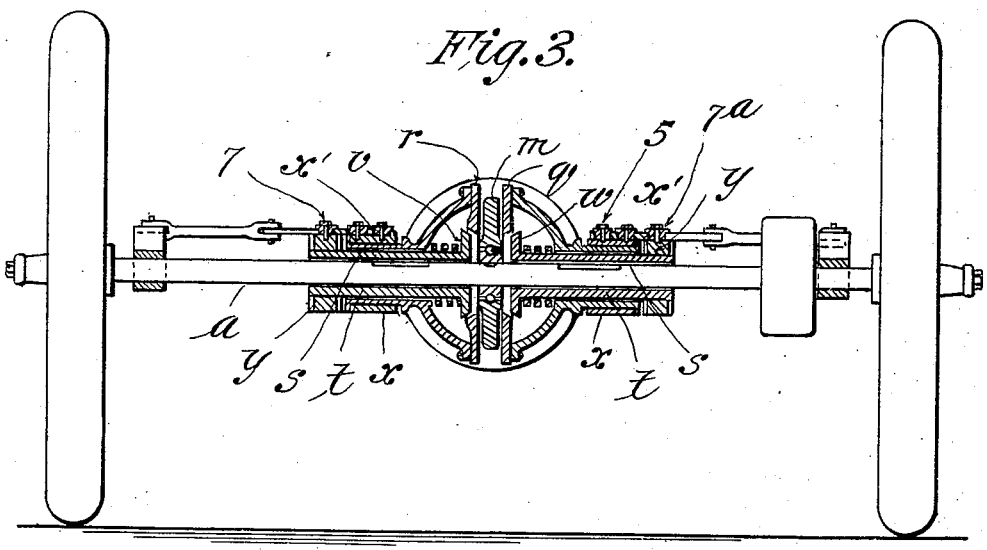
Figure 4:
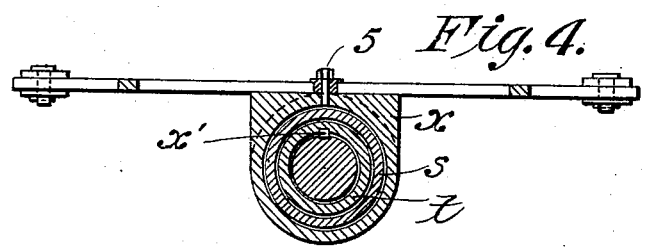
Figure 5:
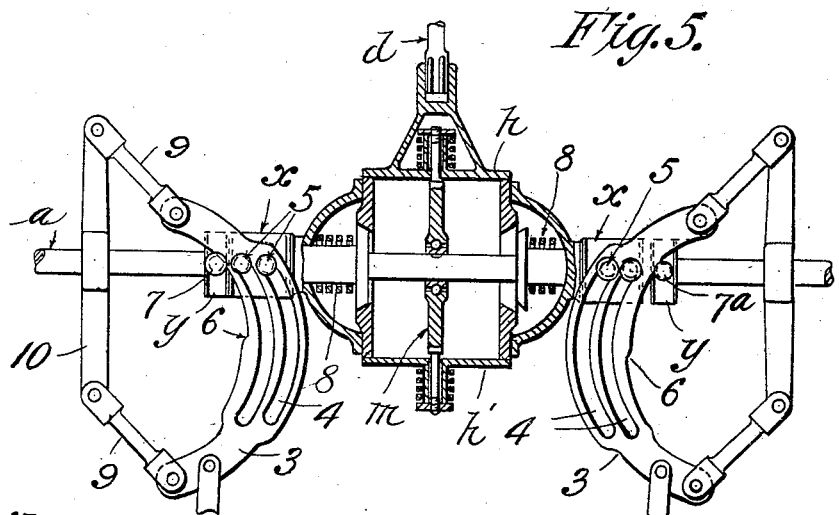

Figure 1 is a plan view of the driving axle of a motor vehicle to which the invention has been applied, the driving and the driven friction disks being shown in section as well as the shaft on which the driven disks are supported, the clutches also being shown partly in section. Fig. 2 is a side elevation of Fig. 1, the driving axle being shown in section, the plane of which is on line 2—2, Fig. 1. Fig. 3 is a sectional elevation of the driving axle showing the construction of the driven disks and clutches and means whereby they are actuated. Fig. 4 is a somewhat enlarged transverse section through the driving-axle in the plane of line 4—4, Fig. 1. Fig. 5 is a plan view of the driving axle showing the actuating devices for the driven disks and clutches in the position they would occupy when the driven disks have been moved outwardly as far as permitted away from the axis of the driving gear. Fig. 6 is a sectional elevation on line 6—6, Fig. 1 of a shaft carried by the axle and constituting a support for certain of the friction disks, said shaft being in axial alinement with the engine shaft.

Referring now to these drawings, in Fig. 1 $a$ is the driving axle on which are the wheels $b$, or, if desired, the wheels may be supported on the frame and rotated by an axle of the so called floating type. At some point in this axle the usual differential gear $c$ should be applied thereto. This differential gear is not shown in detail but is only conventionally indicated by the letter $c$ and it may be of the usual type. From this differential gear the axle $a$ extends in single pieces in opposite directions for operative connection with the wheels.

The driving-shaft, indicated by $d$, is connected with the crank-shaft $e$ of the engine by a universal joint $f$, the other end of the driving-shaft being squared to engage with the squared socket $g$ in the hub of a friction disk $h$ which is provided with a hub $k$ extending inwardly from the face of the disk and axially thereof to provide a bearing for a shaft $m$ which extends through the hub $k$ and has a cap or nut $o$ secured thereon between which and the inner surface of the disk $h$ is a stiff spiral spring $p$. The shaft $m$ (a perspective view of which is shown in Fig. 6) is carried on a ball-bearing on the driving-axle and at right angles thereto, (as shown in Figs. 1 and 3,) and constitutes practically a continuation of the driving-shaft, the end thereof beyond the axle carrying a second disk $h^1$ also provided with a spring $p$ which presses the disk towards its opposite disk $h$. The latter is the driving disk proper,—it and the disk $h^1$ being spring-pressed toward one another. Between these two disks are the driven disks $q$ and $r$,—the hubs $s$ of which are rotatably supported on the long hubs $t$ of the clutch members $v$ and $w$ (see Fig. 3). These hubs $t$ have a spline and groove connection with the axle $a$, as at $x^1$, and on the hubs $s$ of these disks loose collars $x$ are provided, while on the hubs $t$ of the clutches loose collars $y$ are provided the hubs of the clutches extending beyond the ends of the disk hubs to receive these collars. The collars, as shown in Fig. 4, are flat on top to afford suitable bearings for the segmental swinging yokes 3, each provided with the curved slots 4 through which extend the pins 5 on the collars $x$, these pins being provided with rollers to make their movements as easy as possible; only two pins being provided to give the required strength to the construction.

That edge of the yokes 3 contiguous to the collars $y$ is provided with a cam step or shoulder 6 which, on one of the yokes, is inclined oppositely to that of the other and both of these are located substantially midway between the ends of the slots 4; the collars y being provided with pins and rollers 7, 7ª (like the pin rollers 5) which, by means of springs 8 on the hubs of the clutches v and w, hold the pin rollers in contact with said edge of the yokes 3, the springs serving also to engage the clutch members v and w with their seats in the disks r and q, when permitted to do so, that is at the moment either of the pin rollers 7 or 7ª runs off the inclined step or shoulder 6. The yokes 3 are, by means of the links 9, supported on a rigid arm 10 which, as shown in the drawings, is carried on a clip on the axle a.

Attached to each of the yokes is a connecting rod 12 which, as shown in Figs. 1 and 2, extends to two crank-arms 13 on a rock shaft 14 disposed transversely of the vehicle and which is provided with an operating lever 15. When the latter is swung in opposite directions, it imparts like movement simultaneously to each of the yokes 3. It will be observed that the position of the shoulders or steps 6 on these yokes is such that when the yokes are positioned, as shown in Fig. 1, midway of the limit of their movement in either direction, both of the pin rollers 7 and 7ª will rest on the high point of the shoulders 6, and therefore both of the clutch members v and w will be held out of engagement with their respective seats in the disks r and q. If now, by means of the operating lever 15, the yokes are moved to the rear, the first movement thereof will permit the pin roller 7ª to run off its shoulder 6 and thus permit the spring 8 to bring the clutch w to a seat in the disk q and this clutch being splined on the driving-axle a and the disk q held in frictional contact with the disk h, the driving-wheels b will be rotated in a direction to send the vehicle forward, assuming the direction of rotation of the driving shaft d to be as indicated by the arrow thereon. A very slight movement of the yoke will effect this engagement of the clutch, and it will be noted that such engagement can take place only when the disk q has approached closely to the axis of the driving-disk h; hence the shifting of the clutches can be effected only at a very low speed of rotation of the driven disk q but a continuation of the rearward movement of the yokes 3 will cause the segmental slots therein which are engaged by the pin rollers 5 to impart not only radial movement to the disk away from the axis of the driving-shaft but will simultaneously carry the clutch w with it because of the fact that the edge 16 of the yoke against which the pin roller 7ª then bears, is parallel with the curved slots 4 which, in the manner heretofore described, impart radial movement to the driven disks. This radial movement away from the axis of the driving shaft effects the gradual increase of speed in the manner well known in this class of frictional driving mechanisms.

If it be desired now to reduce the speed of the vehicle, a reverse movement of the yokes 3 may be effected by means of the operating lever 15 until, when the yokes arrive at the position shown in Fig. 1, the pin roller 7ª again rides up the shoulder or inclined step 6 and withdraws the clutch w from the driven disk q. Of course, when the parts are in this position, if the engine continues to run, the driving and driven disks will rotate without imparting rotary movement to the axle. Obviously, if the operating lever 15 be swung rearwardly, the pin roller 7 will immediately run off the shoulder or inclined step 6 on its yoke and the same action will take place with regard to the clutch v, and the driven disk r, as has just been described relative to the opposite pair of these elements. It is thus seen that owing to the fact that the shifting of the clutches can take place only when the speed of rotation of the driven disks has been reduced to a minimum, the danger of slip between the contact points of the driving and driven disks is greatly reduced and but one movement, practically, of the operating lever is required to shift the clutch and gradually increase the speed of the vehicle up to the point desired; and it will be observed that the clutch thus engaged can not be released until the driven disks are again moved in close to the axis of the driving disk, and that if the movement of the operating lever be arrested, and the parts are in the position shown in Fig. 1, the driving elements will be in a neutral position and therefore inoperative to impart movement in either direction to the driving axle.

It is thus seen that the mechanism affords a simple frictional driving mechanism with a driving and driven element yieldingly held in operative relation one to the other and provided with an actuating mechanism for imparting movement to the driven element in either direction, which insures the clutching and unclutching of the driving and driven elements in a manner which will entail as little wear and tear on these frictional surfaces as possible.

All the friction disks have been shown as though made in one solid piece, but the peripheries of the disks r and q may be of leather, paper, or other substance that will provide good frictional contact with the surfaces of the disks h, h¹, if desired,—as practiced at present.

What I claim, is:—

1. A friction driving mechanism comprising a driving disk and means to rotate the same, a second disk in axial alinement therewith, said disks being located on opposite sides of an axle or shaft whose axis is at right angles to that of the disks; friction disks rotatably supported on the axle on opposite sides of the axis of the driving disk, and clutches on the axle arranged to engage either of the driven disks at will, said clutches having a sliding movement on the axle and being rotatable therewith, together with means to move the driven disks radially of the driving disks, the clutches and the driven disks being capable of movement in opposite directions as a unit.

2. A friction driving mechanism comprising a driving disk and means to rotate the same, driven disks, and an axle or shaft on which the driven disks are rotatably supported and endwise movable; clutches to engage the driven disks slidable on and rotatable as one with the axle, and means common to both driven disks and clutches to effect the engagement of the clutches and driven disks and to move both of these members radially of the driving disk; the periphery of the driven disks being in frictional contact with the side of the driving disk.

3. A friction driving mechanism comprising an axle or shaft, frictionally driven disks on the axle facing one another, and clutches located on the axle to effect a driving engagement between either of said driven disks and the axle to rotate the latter in either direction; a driving friction disk with which the driven disks have a constant rotative engagement one on either side of the axis of said driving disk, and means to move the driven disks radially of the driving disk, and to effect the engagement and disengagement of said clutches and driven disks successively at one point only of the radial movement of the driven disks.

4. The combination with a driving disk, a shaft therefor, and oppositely facing driven disks having an operative frictional contact with the driving disk and an axle or shaft on which the driven disks are normally freely rotatable, of clutches to effect the engagement of either of the driven disks with the axle to rotate the latter in either direction, and means for moving the clutches alternately for effecting the engagement and disengagement of the clutches.

5. The combination with frictionally driven elements and an axle for rotatably supporting the same, of clutch disks carried by the axle for locking the driven elements to the axle, means for longitudinally moving the clutch disks in opposite directions for engaging and disengaging the opposite faces of the driven elements, said means including arc-shaped elements provided with concentric openings, and means carried by the clutch disks and engaging the openings, as described.

EDWARD O. SUTTON.

Witnesses:
HARRY W. BOWEN,
K. I. CLEMONS.